US011285562B2

(12) United States Patent
Odakura et al.

(10) Patent No.: US 11,285,562 B2
(45) Date of Patent: Mar. 29, 2022

(54) FRICTION STIR WELDING APPARATUS AND FRICTION STIR WELDING METHOD

(71) Applicants: HITACHI POWER SOLUTIONS CO., LTD., Ibaraki (JP); MAZDA MOTOR CORPORATION, Hiroshima (JP)

(72) Inventors: Tomio Odakura, Ibaraki (JP); Hiroki Abe, Ibaraki (JP); Akihiro Satou, Ibaraki (JP); Kohei Funahara, Ibaraki (JP); Koichi Ishiguro, Ibaraki (JP); Shun Shinohara, Ibaraki (JP); Yukihiro Sugimoto, Hiroshima (JP); Katsuya Nishiguchi, Hiroshima (JP); Koujirou Tanaka, Hiroshima (JP); Yasuhiro Morita, Hiroshima (JP)

(73) Assignees: HITACHI POWER SOLUTIONS CO., LTD., Hitachi (JP); MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 17/041,035

(22) PCT Filed: Mar. 27, 2019

(86) PCT No.: PCT/JP2019/013371
§ 371 (c)(1),
(2) Date: Sep. 24, 2020

(87) PCT Pub. No.: WO2019/189470
PCT Pub. Date: Mar. 10, 2019

(65) Prior Publication Data
US 2021/0138576 A1    May 13, 2021

(30) Foreign Application Priority Data
Mar. 29, 2018  (JP) ............................. JP2018-063417

(51) Int. Cl.
*B23K 20/12*     (2006.01)
*B23K 103/20*    (2006.01)

(52) U.S. Cl.
CPC ........ *B23K 20/123* (2013.01); *B23K 20/1245* (2013.01); *B23K 20/1265* (2013.01); *B23K 2103/20* (2018.08)

(58) Field of Classification Search
CPC .............. B23K 20/1255; B23K 20/125; B23K 20/1265; B23K 20/122; B23K 20/126;
(Continued)

(56) References Cited

U.S. PATENT DOCUMENTS 5,853,119 A     12/1998 Searle
2004/0074944 A1  4/2004 Okamoto et al.
(Continued)

FOREIGN PATENT DOCUMENTS

CN    103596719 A    2/2014
DE    102014213647 A  1/2016
(Continued)

OTHER PUBLICATIONS

Chinese Office Action received in corresponding Chinese Application No. 201980015570.9 dated Jun. 29, 2021 with partial translation.

(Continued)

*Primary Examiner* — Erin B Saad
(74) *Attorney, Agent, or Firm* — Mattingly & Malur, PC

(57) ABSTRACT

A friction stir welding apparatus and method maintains a depth of a welded part constant without varying a depth-direction position of a welding tool leading end part relative to welded members. A control device controls an operation of the friction stir welding apparatus, and a holder unit is connected to a swing mechanism unit via a revolving mechanism section, and a welding tool is held to the holder (Continued)

unit. The control device has a first welding mode in which friction stir welding is performed on the basis of a welding condition signal for deciding a welding condition of the welding tool, a swing control signal for controlling the swing mechanism unit, a first hold position decision signal, and a second welding mode in which friction stir welding is performed on the basis of the welding condition signal, the swing control signal, and a second hold position decision signal.

16 Claims, 7 Drawing Sheets

(58) Field of Classification Search
CPC .............. B23K 20/1245; B23K 20/123; B23K 2103/10; B23K 20/129; B23K 20/1225; B23K 20/1235; B23K 20/128; B23K 20/227; B23K 2103/18; B23K 20/124; B23K 2101/18; B23K 2103/05; B23K 2103/04; B23K 31/12; B23K 20/10; B23K 20/12; B23K 20/127; B23K 20/1275; B23K 20/24; B23K 2101/06; B23K 2103/14; B23K 2103/20; B23K 20/002; B23K 20/1215; B23K 20/22; B23K 2101/006; B23K 2101/045; B23K 2101/14; B23K 2103/08; B23K 2103/16; B23K 2103/26; B23K 28/02; B23K 37/0531; B23K 37/06; B23K 20/001; B23K 20/121; B23K 20/14; B23K 20/2275; B23K 20/233; B23K 20/2333; B23K 20/2336; B23K 2101/001; B23K 2101/02; B23K 2101/16; B23K 2101/38; B23K 2103/00; B23K 2103/06; B23K 2103/12; B23K 2103/22; B23K 2103/24; B23K 26/0661; B23K 31/00; B23K 31/125; B23K 33/00; B23K 37/0408; B23K 37/0426; B23K 37/0435
See application file for complete search history.

(56) References Cited

U.S. PATENT DOCUMENTS

| | | |
|---|---|---|
| 2005/0156011 A1 | 7/2005 | Brownell et al. |
| 2007/0181637 A1 | 8/2007 | Hirano et al. |
| 2011/0041982 A1 | 2/2011 | Fleming et al. |
| 2014/0034709 A1 | 2/2014 | Oki et al. |
| 2018/0071860 A1 | 3/2018 | Odakura et al. |

FOREIGN PATENT DOCUMENTS

| | | |
|---|---|---|
| EP | 0785044 A | 7/1997 |
| JP | 2004-136331 A | 5/2004 |
| JP | 2004-174508 A | 6/2004 |
| JP | 2005-313227 A | 11/2005 |
| JP | 4511526 B2 | 7/2010 |
| JP | 2014-024095 A | 2/2014 |
| JP | 6408735 B1 | 10/2018 |
| KR | 10-2017-0127008 A | 11/2017 |

OTHER PUBLICATIONS

Korean Office Action received in corresponding Korean Application No. 10-2020-7026908 dated Aug. 20, 2021.
International Search Report of PCT/JP2019/013371 dated Jul. 2, 2019.
Extended European Search Report received in corresponding European Application No. 19775582.0 dated Nov. 9, 2021.

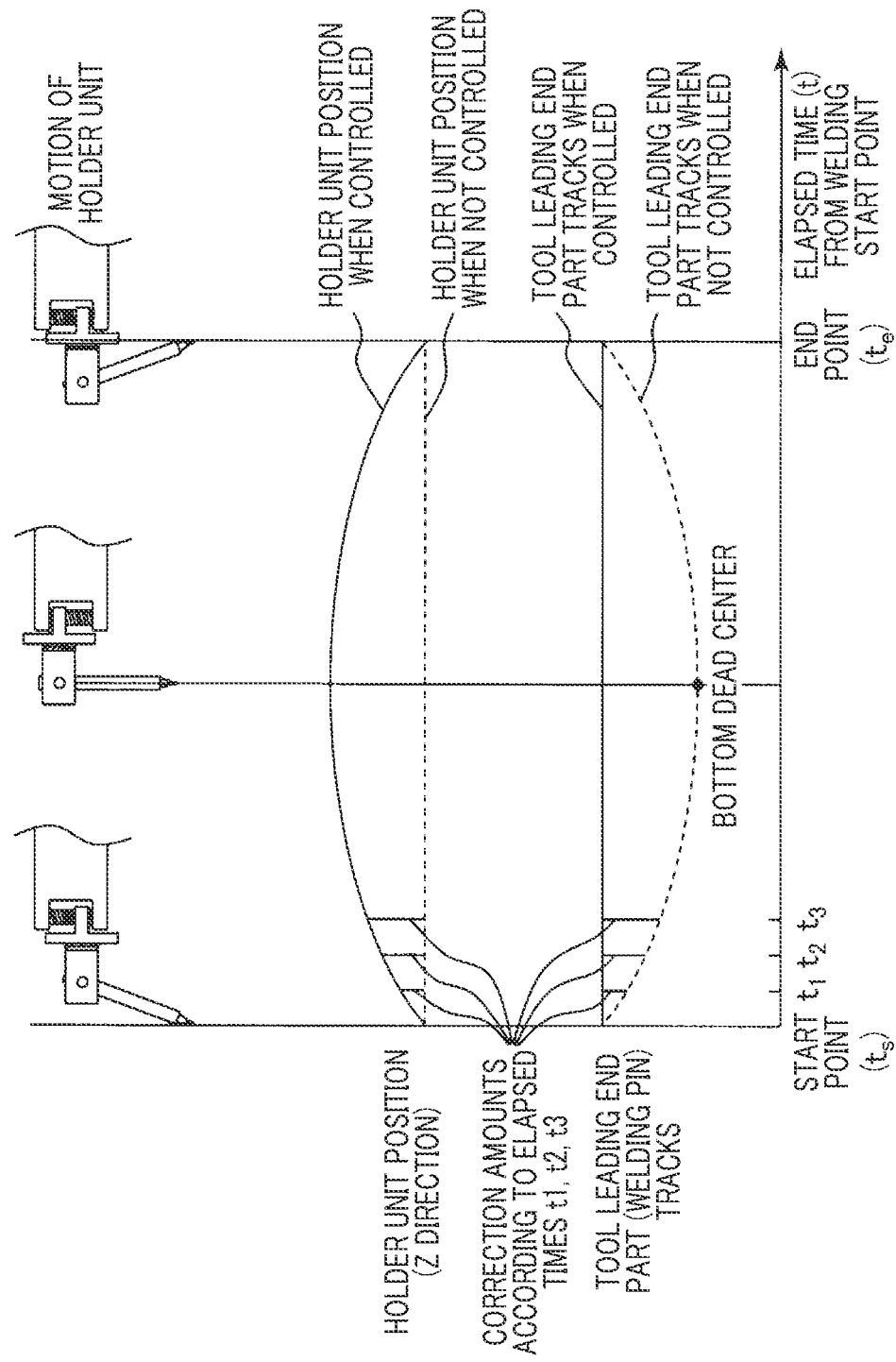

FIG. 3

| NO. | FSW WELDING CONDITIONS (WELDING PARAMETERS) | | CONDITIONS OF WELDED MEMBERS |
|---|---|---|---|
| 1 | ROTATION NUMBER (OF WELDING TOOL) | $N$ (rps) | MATERIAL QUALITY, SHAPE, PLATE THICKNESS |
| 2 | INSERTION AMOUNT (OF WELDING TOOL) | $Z_1$ (mm) | PLATE THICKNESS |
| 3 | SWING AMOUNT (OF WELDING TOOL) | $L$ (mm) OR $T$ (s) OR $\theta$ (deg.) | SHAPE (SIZE, LENGTH) |
| 4 | SWING VELOCITY (OF WELDING TOOL) | $V$ (mm/s) | MATERIAL QUALITY, SHAPE, PLATE THICKNESS |
| 5 | INSERTION VELOCITY (OF WELDING TOOL) | $V_p$ (mm/s) | MATERIAL QUALITY, SHAPE, PLATE THICKNESS |
| 6 | HOLD TIME (AFTER INSERTION OF WELDING TOOL) | $T_h$ (s) | MATERIAL QUALITY, SHAPE, PLATE THICKNESS |

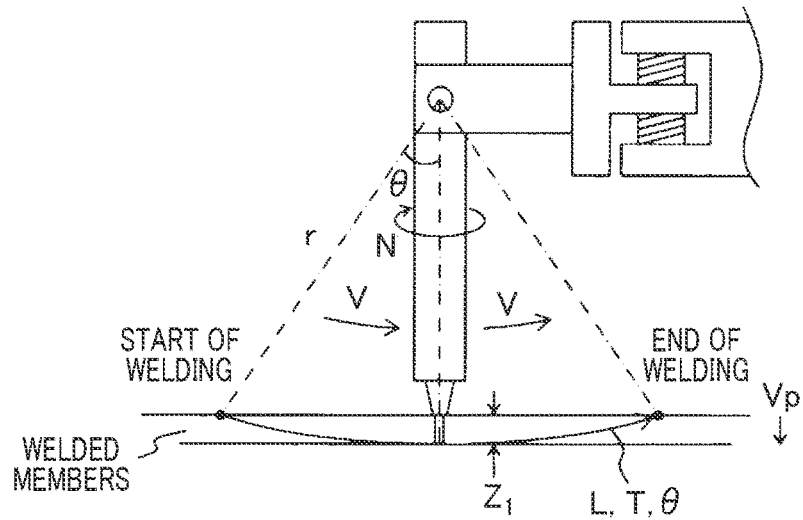

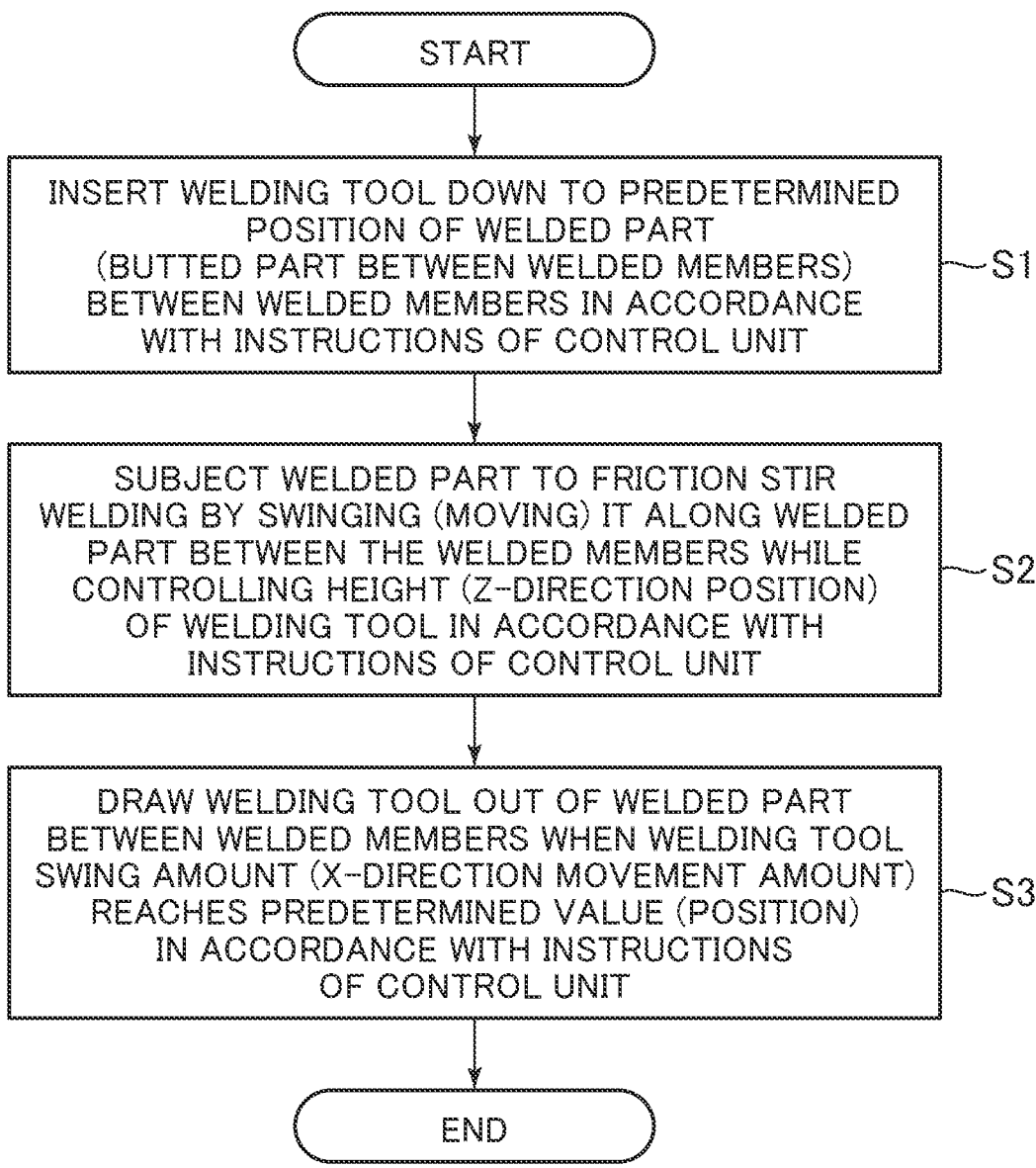

FRICTION STIR WELDING APPARATUS AND FRICTION STIR WELDING METHOD

TECHNICAL FIELD

The present invention relates to a friction stir welding apparatus and a friction stir welding method which weld together welded members by friction stir welding and, in particular, relates to a technology which is effective for application to welding of welded members of a thin plate.

BACKGROUND ART

In Friction Stir Welding (FSW) which welds together welded materials by softening the welded materials with friction heat which is generated by rotating a columnar welding tool and stirring that part, since a raw material other than the materials is not used, fatigue strength is high and in addition since the materials do not melt, welding which is reduced in welding deformation (distortion) is possible and application thereof to wide fields such as bodies of aircrafts, automobiles and so forth is expected.

Friction stir welding of a composite material which is composed of different materials such as, for example, steel (which is a frame material) and aluminum (AL) and so forth becomes an important issue, in particular, in the automotive industry which aims a reduction in auto body weight for the purpose of improving fuel consumption and then reducing carbon dioxide emissions.

As a background art of the present technical field, there exists the art such as, for example, Patent Literature 1. "A technology of performing friction stir welding one spot at a time by swinging a welding tool which is held to a welding head" is disclosed in Patent Literature 1.

CITATION LIST

Patent Literature

Patent Literature 1: Japanese Patent No. 4511526

SUMMARY OF INVENTION

Technical Problem

Incidentally, in order to weld together welded members by an FSW apparatus while maintaining high welding quality, it is necessary to perform stir welding in a state of accurately disposing a leading end part of the welding tool which is held by the welding head (a welding tool holder unit) in a desirable position. That is, in a case where the position of the leading end part (a welding pin) of the welding tool varies, the high welding quality cannot be maintained.

However, for example, in such conventional friction stir welding as disclosed in Patent Literature 1, due to swinging with a swing axis being set as a fulcrum while fixing a hold position of the welding head (the welding tool holder unit), the leading end part (the welding pin) of the welding tool draws an arc, and therefore the position of the leading end part (the welding pin) of the welding tool varies and the high welding quality cannot be maintained.

Accordingly, an object of the present invention is to provide a friction stir welding apparatus and a friction stir welding method which make it possible to maintain a depth of a welded part constant without varying a depth-direction (Z-direction) position of the welding tool leading end part relative to the welded members from start of friction stir welding to end of friction stir welding.

Solution to Problem

In order to solve the above-mentioned problems, the present invention provides a friction stir welding apparatus which welds together welded members by friction stir welding, including an apparatus main body, a control device which controls an operation of the friction stir welding apparatus, a swing mechanism unit which is connected to the apparatus main body via an up/down motion drive mechanism section, a holder unit which is connected to the swing mechanism unit via a revolving mechanism section, and a welding tool which is held to the holder unit, in which the control device has a first welding mode in which friction stir welding is performed on the basis of a welding condition signal for deciding a welding condition of the welding tool, a swing control signal for controlling the swing mechanism unit, and a first hold position decision signal for deciding a hold position of the welding tool by the up/down motion drive mechanism section, and a second welding mode in which friction stir welding is performed on the basis of the welding condition signal, the swing control signal, and a second hold position decision signal which is obtained by correcting the first hold position decision signal so as to control a depth of a welded part constant in accordance with a state of the welded members, and includes the first welding mode and the second welding mode in one welding pass from insertion of the welding tool into between the welded members to draw-out thereof.

In addition, the present invention provides a friction stir welding apparatus which welds together welded members by friction stir welding, including a control device which controls an operation of the friction stir welding apparatus, a multiaxial robot arm which has a plurality of joints and is freely movable in a three-dimensional space, a C-type frame which is connected to a leading end of the multiaxial robot arm, a swing mechanism unit which is connected to one end of the C-type frame via an up/down motion drive mechanism section, a holder unit which is connected to the swing mechanism unit via a revolving mechanism section, a welding tool which is held to the holder unit, and a pressing force receiving section which is connected to the other end of the C-type frame and receives pressing force from the welding tool, in which the control device has a first welding mode in which friction stir welding is performed on the basis of a welding condition signal for deciding a welding condition of the welding tool, a swing control signal for controlling the swing mechanism unit, and a first hold position decision signal for deciding a hold position of the welding tool by the up/down motion drive mechanism section, and a second welding mode in which friction stir welding is performed on the basis of the welding condition signal, the swing control signal, and a second hold position decision signal which is obtained by correcting the first hold position decision signal so as to control a depth of a welded part constant in accordance with a state of the welded members, and includes the first welding mode and the second welding mode in one welding pass from insertion of the welding tool into between the welded members to draw-out thereof.

In addition, the present invention provides a friction stir welding method of welding together welded members by friction stir welding, including (a) the step of inserting a welding tool down to a predetermined position of a welded part between the welded members in accordance with instructions of a control unit, (b) the step of subjecting the welded part to friction stir welding by swinging the welding tool along the welded part while controlling a height of the welding tool relative to the welded members so as to control a depth of the welded part constant in accordance with instructions of the control unit, and (c) the step of drawing the welding tool out of the welded part at a time point that a swing amount of the welding tool reaches a predetermined position in accordance with instructions of the control unit.

Advantageous Effects of the Invention

According to the present invention, there can be realized the friction stir welding apparatus and the friction stir welding method which make it possible to maintain the depth of the welded part constant without varying the depth-direction (Z-direction) position of the welding tool leading end part relative to the welded members from the start of friction stir welding to the end of friction stir welding.

Thereby, welding reliability of the welded part, for example, when subjecting a composite material which is composed of a steel frame material and a thin-plate-shaped aluminum material to friction stir welding is improved.

Problems, configurations and effects other than the above-mentioned ones will become apparent from the following description of embodiments.

BRIEF DESCRIPTION OF DRAWINGS

FIG. 2 is a diagram illustrating an operation (action) of the friction stir welding apparatus according to one embodiment of the present invention.

FIG. 3 is a diagram illustrating welding parameters of the friction stir welding apparatus according to one embodiment of the present invention.

FIG. 4 is a flowchart illustrating a friction stir welding method according to one embodiment of the present invention.

DESCRIPTION OF EMBODIMENTS

In the following, embodiments of the present invention will be described by using the drawings. Incidentally, in each drawing, the same numeral is assigned to the same configuration and a detailed description of overlapped parts is omitted.

Embodiment 1

Figure 5A:
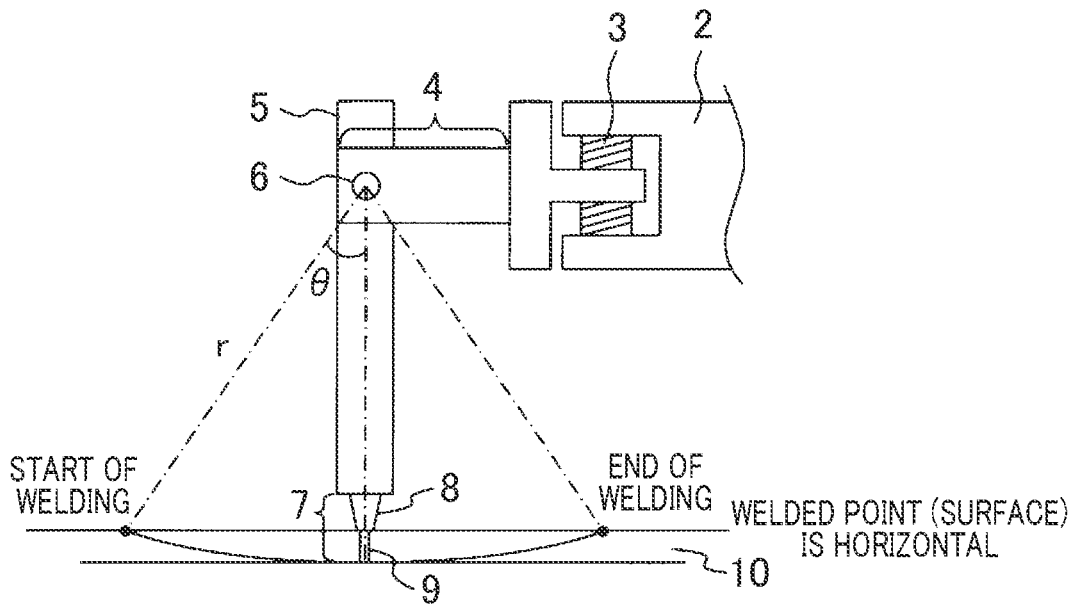
FIG. 5A is a diagram schematically illustrating a manner of friction stir welding according to the present invention.
Figure 5B:
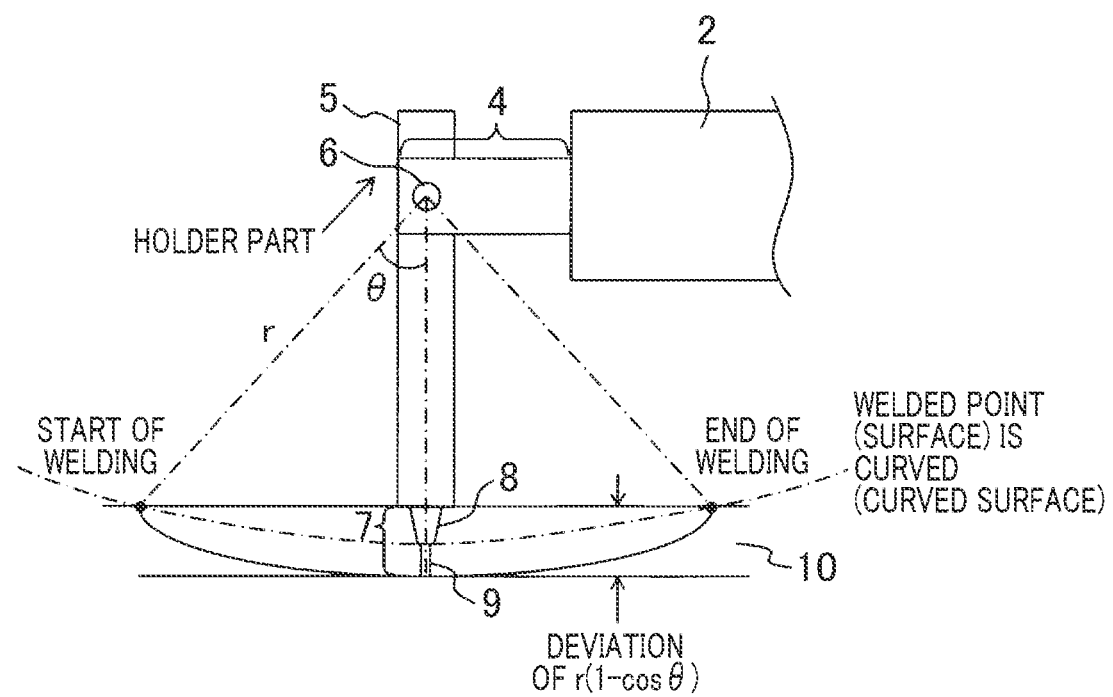
FIG. 5B is a diagram schematically illustrating a manner of conventional friction stir welding.

First, problems of the above-mentioned conventional friction stir welding will be described in detail with reference to FIG. 5B. FIG. 5B is a diagram schematically illustrating a manner of friction stir welding by a conventional friction stir welding apparatus.

In the conventional friction stir welding apparatus, as illustrated in FIG. 5B, (1) assuming that a revolving mechanism section 6 of a swing mechanism unit 4 which is fixed to an apparatus main body 2 is set as a center point and a length from the center point (the revolving mechanism section 6) concerned to a leading end part of a welding tool unit 7 is set as r, and (2) then, assuming that an angle which is made on an intersection point between a center line when the leading end part of the welding tool unit 7 is in a vertically downward state (a bottom dead center) and a straight line which connects it with the leading end part of the welding tool unit 7 is set as θ, (3) when performing friction stir welding, the leading end part of the welding tool unit 7 will draw an arc through 2θ from start of friction stir welding to end of friction stir welding with r being set as a radius.

In the arc concerned, when the leading end part of the welding tool unit 7 is located at the bottom dead center, a deviation of the amount of r (1-cos θ) occurs between a straight line which connects together a friction stir welding start point and a friction stir wending end point and the leading end part of the welding tool unit 7. As a result, a welded point (a welded surface) is curved (a curved surface) and gives an adverse effect to welding quality. In particular, in a case one welded member is a thin plate (thin in thickness), when the plate thickness of the welded member becomes thinner than the deviation r (1-cos θ), there is a fear that a welded part will penetrate the welded members and will affect a base.

Figure 1:
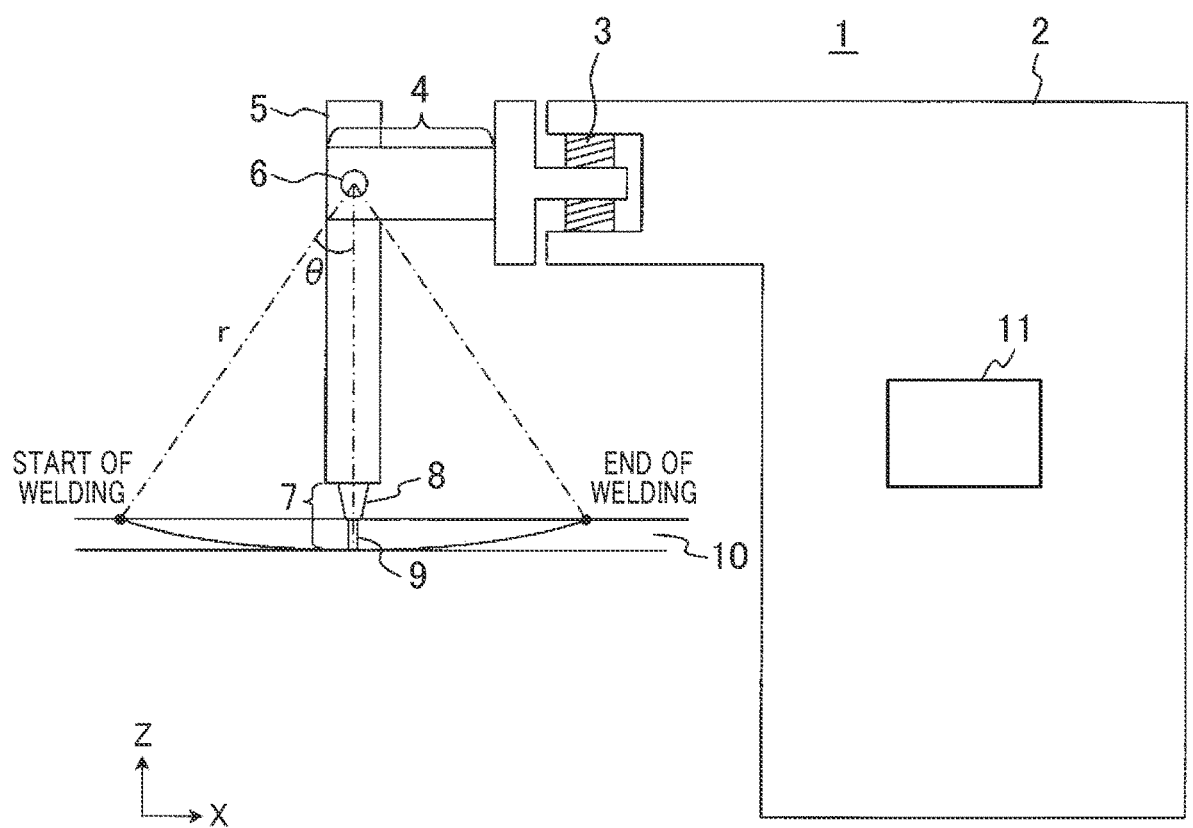
FIG. 1 is a diagram illustrating an overview of a friction stir welding apparatus according to one embodiment of the present invention.

Next, a friction stir welding apparatus and a friction stir welding method of the embodiment 1 will be described with reference to FIG. 1 to FIG. 5A. FIG. 1 illustrates an overview of a friction stir welding apparatus 1 of the present embodiment. FIG. 2 conceptionally illustrates an operations (action) thereof. FIG. 3 illustrates wending conditions (welding parameters) which are necessary for control of the friction stir welding apparatus 1. FIG. 4 is a flowchart illustrating the friction stir welding method of the present embodiment. In addition, FIG. 5A schematically illustrates a manner of friction stir welding by the friction stir welding apparatus 1 of the present embodiment and is a diagram which corresponds to FIG. 5B which illustrates the manner of friction stir welding by the conventional friction stir welding apparatus.

As illustrated in FIG. 1, the friction stir welding apparatus 1 is equipped with an apparatus main body 2, a swing mechanism unit 4 which is connected to the apparatus main body 2 via an up/down motion drive mechanism section 3, a holder unit (a welding head) 5 which is connected to the swing mechanism unit 4 via a revolving mechanism section 6, and a welding tool unit 7 which is held by the holder unit (the welding head) 5. As exemplified in FIG. 1, for example, a ball screw or the like is used as the up/down motion drive mechanism section 3. The welding tool unit 7 is configured by a shoulder 8 and a welding pin 9 and the welding pin 9 is held to the holder unit (the welding head) 5 via the shoulder 8.

This welding pin 9 is inserted into a butted part between welded members 10 and rotates at a high speed and thereby friction heat is generated between the welding pin 9 and the welded members 10, a plastic flow is generated in the welded members 10 with the friction heat and the welded part is stirred. When the welding pin 9 moves, a stirred part (the welded part) is cooled and the welded members are welded together.

A control unit (a control device) 11 which controls the operation of the friction stir welding apparatus 1 is installed in the apparatus main body 2. The control unit (the control device) 11 is equipped with a storage unit (not illustrated) which stores welding parameters (FSW welding conditions) such as a welding condition signal used for deciding conditions of welding by the welding tool unit 7 and a swing control signal used for controlling the swing mechanism unit 4, a hold position decision signal used for deciding a height-direction (Z-direction) hold position (an insertion amount of the welding pin 9) of the welding tool unit 7 by the up/down motion drive mechanism section 3 and so forth.

Next, the operation (action) of the friction stir welding apparatus 1 will be described by using FIG. 2 and FIG. 3. FIG. 2 conceptually illustrates a motion of the holder unit (the welding head) 5 in FIG. 1, the transverse axis indicates an X direction in FIG. 1 and the longitudinal axis indicates the Z direction (the height direction). In the conventional friction stir welding apparatus, the Z-direction (height-direction) position of the holder unit (the welding head) 5 is maintained constant from a friction stir welding start point ($t_s$) to a friction stir welding end point ($t_e$) as in the above-described Patent Literature 1. (The second line from the top in FIG. 2) At this time, the leading end part (the welding pin 9) of the welding tool unit 7 performs a swing operation while drawing such a track as shown by the lowermost line in FIG. 2. As a result, the welded point (the welded surface) between the welded members is curved (the curved surface).

On the other hand, in the friction stir welding apparatus 1 of the present embodiment, the holder unit (the welding head) 5 is swung (moved) in the X direction while correcting the Z-direction (height-direction) position of the holder unit (the welding head) 5 at predetermined intervals from the friction stir welding start point ($t_s$). (The uppermost line in FIG. 2) Here, an example of a correction which is made per a fixed elapsed time in order of $t_1$, $t_2$, $t_3$ counted from the friction stir welding start point ($t_s$) is illustrated. (Here, for example, a welding mode at the start point $t_s$ is a first welding mode, a welding mode at $t_1$ is a second welding mode, a welding mode at $t_2$ is a third welding mode, and a welding mode at $t_3$ is a fourth welding mode.) Thereby, the leading end part (the welding pin 9) of the welding tool unit 7 performs the swing operation while drawing such a track as indicated by the second line from the bottom in FIG. 2. As a result, the welded point (the welded surface) between the welded members becomes horizontal.

Incidentally, although in the operation of the friction stir welding apparatus 1 which is illustrated in FIG. 2, an example that control is conducted such that the welded point (the welded surface) between the welded members becomes horizontal is illustrated, the position of the welded point (the welded surface) between the welded members from start of welding to end of welding can be optionally controlled by controlling the operation of the welding tool unit 7 so as to include a plurality of welding modes in one welding operation (one welding pass: pass) from the friction stir welding start point ($t_s$) to the friction stir welding end point ($t_e$).

Accordingly, even in a case of a curved line (a curved surface) that a desired welded interface vertically changes, the Z-direction (height-direction) position of the welding tool unit 7 can be controlled conforming with a change in vertical position of the welded interface and the welded interface which is high in accuracy and reliability can be obtained.

That is, in a case where a height (a depth) of the welded interface is not constant and changes and so forth, instead of such conventional decision of the position of the welded interface only on the basis of the position of the welding tool unit at the welding start time and the position of the welding tool unit at the welding end time as illustrated in FIG. 5B, the welding tool unit 7 is controlled by capturing a change (conforming with a change) in vertical position of the welded interface.

The above-described operation (action) illustrated in FIG. 2 is performed by controlling the operation of the friction stir welding apparatus 1 by the control unit (the control device) 11 on the basis of the welding parameters which are stored (registered) in advance in the storage of the control unit (the control device) 11 in accordance with states of the welded members such as material quality and a shape (a size, a length), a plate thicknesses and so forth and which are illustrated in FIG. 3.

As the FSW welding conditions (the welding parameters), a welding tool rotation number (N), a welding tool insertion amount ($Z_1$), that is, the Z-direction (height-direction) position of the holder unit (the welding head) 5, welding tool swing amounts (L, T, θ), a welding tool swing velocity (V), a welding tool insertion velocity ($V_p$), a hold time ($T_h$) after insertion of the welding tool into the welded part and so forth are given as illustrated in FIG. 3.

Incidentally, the control of the friction stir welding apparatus 1 is not limited to the FSW welding conditions (the welding parameters) which are illustrated in FIG. 3 and welding parameters other than those may be included. In addition, although an example that the Z-direction (height-direction) position of the holder unit (the welding head) 5 is corrected in accordance with the elapsed time (T) from the friction stir welding start point ($t_s$) is illustrated in FIG. 2, the Z-direction (height-direction) position of the holder unit (the welding head) 5 may be corrected in accordance with, for example, a swing distance (L), a swing angle (θ), a swing angular velocity of the welding tool unit (the swing mechanism unit 4) in the welding parameters which are illustrated in FIG. 3.

In addition, the Z-direction (height-direction) position correction of the holder unit (the welding head) 5 may be made also by selection from the plurality of holding position decision signals which are stored (registered) in advance in the storage of the control unit (the control device) 11 in accordance with the state of the wended members and the elapsed time (T) from the friction stir welding start point ($t_s$), the swing distance (L), the swing angle (θ), the swing angular velocity of the welding tool unit (the swing mechanism unit 4).

A typical friction stir welding method by the friction stir welding apparatus of the above-described present embodiment will be described by using FIG. 4.

First, the welding tool unit 7 is inserted down to a predetermined position of the welded part (the batted part between the welded members) between the welded members 10 in accordance with instructions of the control unit (the control device) 11. (Step S1)

Next, the welded part is subjected to friction stir welding by swinging (moving) the welding tool unit 7 along the welded part between the welded members 10 while controlling the height (the Z-direction position) of the welding tool unit 7 in accordance with instructions of the control unit (the control device) 11. (Step S2)

Then, a friction stir welding process is terminated by drawing the welding tool unit 7 out of the welded part between the welded members 10 at the time point that the swing amount (an X-direction movement amount) of the welding tool unit 7 reaches a predetermined value (position) in accordance with instructions of the control unit (the control device) 11. (Step S3)

As described above, according to the friction stir welding apparatus and the friction stir welding method of the present embodiment, the depth of the welded part can be controlled constant without varying a depth-direction (Z-direction) position of the welding tool leading end part relative to the welded members from the start of friction stir welding to the end of friction stir welding.

Thereby, for example, when subjecting a composite material which is composed of a steel frame material and a thin-plate-shaped aluminum material to friction stir welding, the aluminum material which is an upper layer (a front layer) can be subjected to friction stir welding accurately with no influence on the steel frame material which is a base and welding reliability of the welded part is improved.

In addition, in a case where a composite member which is composed of different materials that a base (a lower layer) is composed of a resinous member and an upper layer is composed of a metal material such as a steel material, an aluminum material and so forth is subjected to friction stir welding (a case of metal-resin welding by thermal welding), also an insertion depth of the welding tool unit can be controlled such that a temperature of a welded interface between the resinous member and the metal material becomes constant.

Embodiment 2

Figure 6:
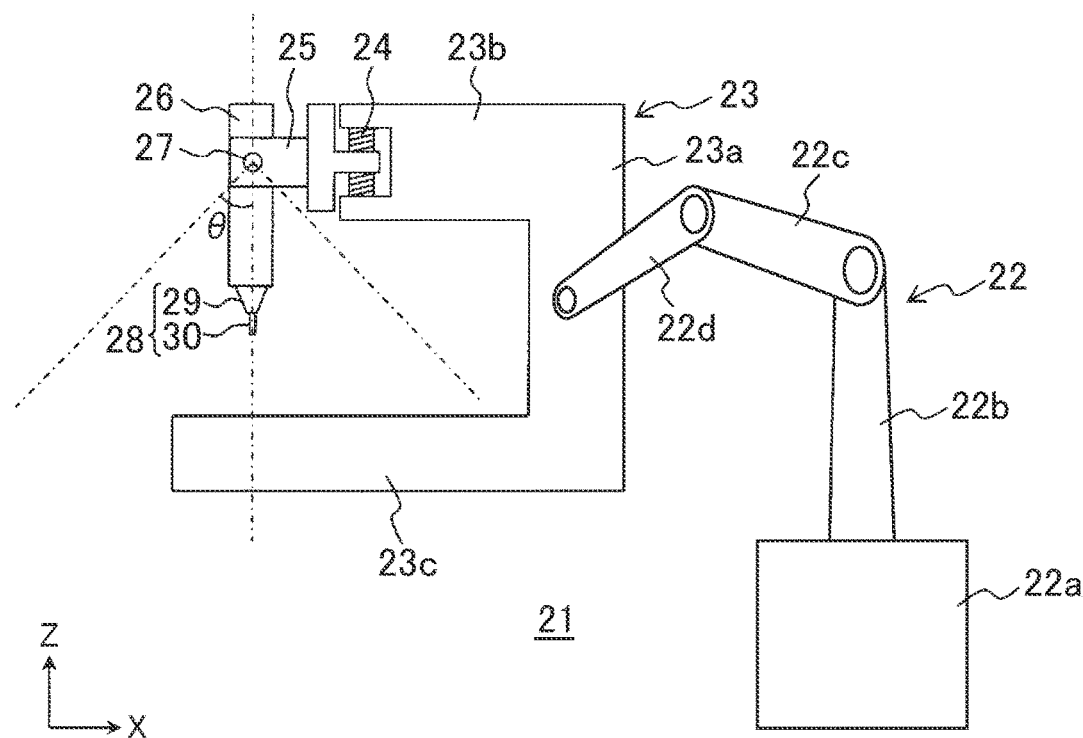
FIG. 6 is a diagram illustrating an overview of a friction stir welding apparatus according to one embodiment of the present invention.
Figure 7A:
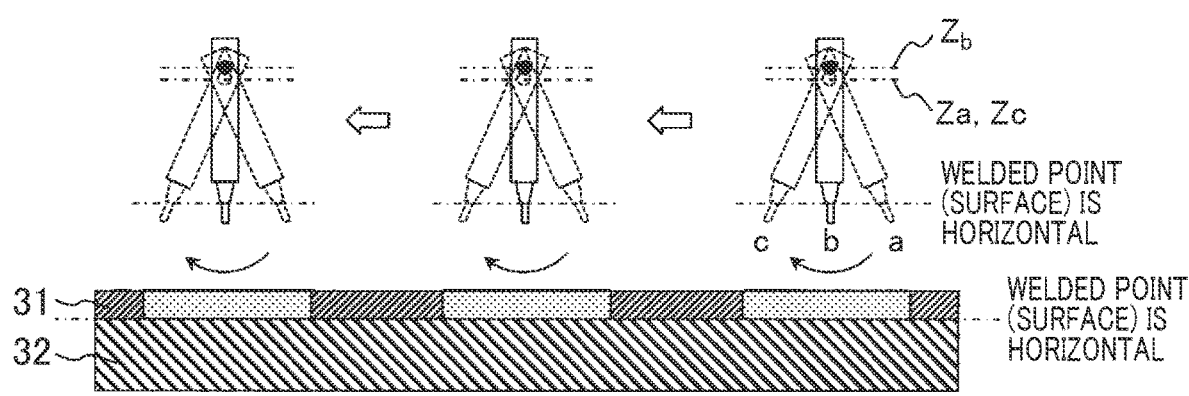
FIG. 7A is a diagram schematically illustrating a manner of friction stir welding according to the present invention.
Figure 7B:
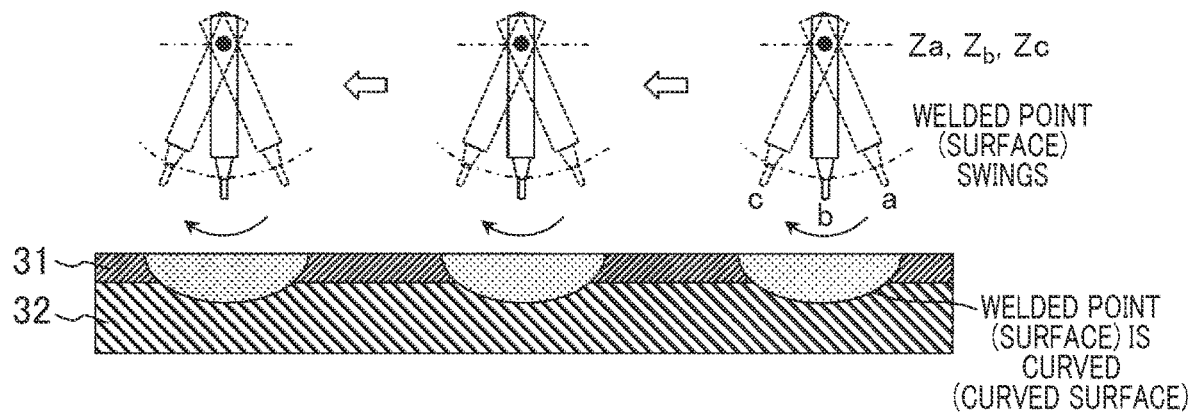
FIG. 7B is a diagram schematically illustrating a manner of conventional friction stir welding.

A friction stir welding apparatus and a friction stir welding method of the embodiment 2 will be described with reference to FIG. 6 to FIG. 7B. FIG. 6 illustrates an overview of a friction stir welding apparatus 21 of the present embodiment. FIG. 7A schematically illustrates a manner of friction stir welding by the friction stir welding apparatus 21. FIG. 7B is a diagram illustrating a manner of friction stir welding by a conventional friction stir welding apparatus and is illustrated for description in comparison with FIG. 7A.

As illustrated in FIG. 6, the friction stir welding apparatus 21 is equipped with a multiaxial robot 22, a C-type frame 23, a swing mechanism unit 25 which is connected with the C-type frame 23 via an up/down motion drive mechanism section (a ball screw) 24 which is a lift device, a holder unit (a welding head) 26 which is connected with the swing mechanism unit 25 via a revolving mechanism section 27, and a welding tool unit 28 which is held by the holder unit (the welding head) 26 as main configurations. The welding tool unit 28 is configured by a shoulder 29 and a welding pin 30 and the welding pin 30 is held to the holder unit (the welding head) 26 via the shoulder 29.

The multiaxial robot 22 is a vertical articulated robot which is generally called a robot arm and can freely operate (move) in a three-dimensional space with the aid of an articulated structure and a servo motor. Although a movable range changes depending on the number of joints (the number of axes), here, an example of a triaxial type robot arm which has a lower arm section 22b, an upper arm section 22c, and a wrist section 22d on a pedestal section 22a is illustrated. A white circle part of the multiaxial robot 22 is a joint.

Incidentally, the friction stir welding apparatus 21 is equipped with a control device (not illustrated) in which a servo amplifier, a substrate and so forth are housed and the motion of the multiaxial robot 22 is comprehensively controlled in accordance with instructions (program signals) from this control device.

The almost C-shaped (or almost inverted C-shaped) C-type frame 23 is connected to a leading end of the wrist section 22d of the multiaxial robot 22 via a joint so as to freely revolve. The C-type frame 23 is configured by a holding section (a standing section) 23a which is connected to the leading end of the wrist section 22d and holds the C-type frame 23 itself to the multiaxial robot 22, a swing mechanism holding section 23b which is connected to one end of the holding section 23a and holds the swing mechanism unit 25 via the up/down motion drive mechanism section (the ball screw) 24, and a pressing force receiving section 23c which is connected to the other end of the holding (standing) section 23a and receives pressing force from the welding tool unit 28.

Incidentally, although an example that the holding (standing) section 23a, the swing mechanism holding section 23b, and the pressing force receiving section 23c configure the C-type frame 23 as an integrated object is illustrated in FIG. 6, it also includes an example that the respective parts are formed as separate bodies and the C-type frame 23 is configured by combining them together.

The swing mechanism unit 25 is connected to the swing mechanism holding section 23b via the up/down motion drive mechanism section (the ball screw) 24 and operates in an up/down direction (here, the Z direction in FIG. 6) relative to the swing mechanism holding section 23b.

The holder unit (the welding head) 26 is connected with the swing mechanism unit 25 via the revolving mechanism section 27 and performs the swing operation in a front/back direction (here, the X direction in FIG. 6) relative to the swing mechanism unit 25.

The welding tool unit 28 is configured by the shoulder 29 and the welding pin 30 and performs friction stir welding by inserting the welding pin 30 into between the welded members down to a predetermined depth while rotating the welding pin 30 at a high speed and moving it along the welded part (the welded line).

As described above, the friction stir welding apparatus 21 of the present embodiment connects the holder unit (the welding head) 26 and the welding tool unit 28 to the C-type frame 23 (the apparatus main body) via the up/down motion drive mechanism section 24 and the swing mechanism unit 25, the revolving mechanism section 27 similarly to the embodiment 1, and makes the leading end part (the welding pin 30) of the welding tool unit 28 perform the swing operation in the X direction in FIG. 6 and can control the Z-direction (height-direction) position thereof when performing friction stir welding.

FIG. 7A schematically illustrates the manner of a case where a composite material of a steel material (a frame material) 32 and aluminum (AL) 32 is spot-welded intermittently by the friction stir welding apparatus 21 of the present embodiment. As illustrated in FIG. 7A, when welding together the welded members by the friction stir welding apparatus 21, heights (Z-direction positions; $Z_a$, $Z_b$, $Z_c$ in FIG. 7A) of the revolving mechanism section 27 which serves as a fulcrum of the swing operation of the holder unit (the welding head) 26 are controlled by the up/down motion drive mechanism section 24.

Thereby, the welded point (the welded surface) can be controlled to a constant depth (horizontal). In the example in FIG. 7A, friction stir welding becomes possible along an interface between the steel material (the frame material) 32 and the aluminum (AL) 32.

In the conventional friction stir welding apparatus, since operations are limited to those of the swing mechanism unit 25 and the revolving mechanism section 27, when welding together the wended members as illustrated in FIG. 7B, the heights (the Z-direction positions; $Z_a$, $Z_b$, $Z_c$ in FIG. 7B) of the revolving mechanism section 27 which serves as the fulcrum of the swing operation of the holder unit (the welding head) 26 are constant. Therefore, the welded point (the welded surface) is curved (the curved surface), it reaches the base steel material (the frame material) 32 and thus there is a fear that the reliability of the welded part will be lowered. On the other hand, in the friction stir welding apparatus 21 of the present embodiment, as illustrated in FIG. 7A, the welded point (the welded surface) can be controlled to the constant depth (horizontal) and the welding quality of the welded part can be ensured.

In addition, in the present embodiment, since the holder unit (the welding head) 26 and the welding tool unit 28 are connected to the C-type frame 23 via the up/down motion drive mechanism section 24 and the swing mechanism unit 25, the revolving mechanism section 27 and, in addition, the C-type frame 23 is held by the multiaxial robot arm 22, the welded point (the welded surface) can be freely moved in the three-dimensional space. Thereby, friction stir welding of the welded members which are sterically disposed just like an automobile body and have a complicated shape including the curved surface can be performed accurately.

Incidentally, the present invention is not limited to the above-described embodiments and various modified examples are included. For example, the above-mentioned embodiments are described in detail in order to intelligibly explain the present invention and are not necessarily limited to those which are equipped with all the configurations which are described. In addition, it is possible to replace part of a configuration of one embodiment with a configuration of another embodiment, and it is also possible to add a configuration of another embodiment to a configuration of one embodiment. In addition, it is possible to add/delete/replace another configuration to/from/with part of one configuration of each embodiment.

In addition, the present invention also has the following feature.

[Additional Remark] A friction stir welding method using a friction stir welding apparatus which is configured by an apparatus main body, a holder unit being provided on a swing mechanism unit which is provided on an up/down motion drive mechanism section of the apparatus main body, a welding tool unit which is held to the holder unit, including the step of storing a first hold position decision value for deciding a first hold position of the up/down motion drive mechanism section, a plurality of second hold position decision values which decide in accordance with an elapsed time after start of welding, a welding condition for the welding tool unit, and a swing control condition for controlling the swing mechanism unit in the apparatus main body, the step of deciding the hold position of the up/down motion drive mechanism section when starting friction stir welding on the basis of the first hold position decision value and starting friction stir welding on the basis of the welding condition, and the step of repeating friction stir welding on the basis of the welding condition by changing the hold position of the up/down motion drive mechanism section on the basis of the second hold position decision value which conforms with the elapsed time when a predetermined time has elapsed after start of friction stir welding while swinging the swing mechanism on the basis of the swing control condition.

REFERENCE SIGNS LIST

1 . . . friction stir welding apparatus, 2 . . . apparatus main body, 3 . . . up/down motion drive mechanism section (ball screw), 4 . . . swing mechanism unit, 5 . . . holder unit (welding head), 6 . . . revolving mechanism section, 7 . . . welding tool unit, 8 . . . shoulder, 9 . . . welding pin, 10 . . . welded member, 11 . . . control unit (control device), 21 . . . friction stir welding apparatus, 22 . . . multiaxial robot, 22a . . . pedestal section, 22b . . . lower arm section, 22c . . . upper arm section, 22d . . . wrist section, 23 . . . C-type frame, 23a . . . holding section (standing section), 23b . . . swing mechanism holding section, 23c . . . pressing force receiving section, 24 . . . up/down motion drive mechanism section (ball screw), 25 . . . swing mechanism unit, 26 . . . holder unit (welding head), 27 . . . revolving mechanism section, 28 . . . welding tool unit, 29 . . . shoulder, 30 . . . welding pin, 31 . . . aluminum (AL), 32 . . . steel plate (frame material).

The invention claimed is:

1. A friction stir welding apparatus which welds together members by friction stir welding, comprising:

an apparatus main body;

a control device which controls an operation of the friction stir welding apparatus;

a swing mechanism unit which is connected to the apparatus main body via an up/down motion drive mechanism section;

a holder unit which is connected to the swing mechanism unit via a revolving mechanism section; and a welding tool which is held to the holder unit, wherein the control device has a first welding mode in which friction stir welding is performed on the basis of a welding condition signal for deciding a welding condition of the welding tool, a swing control signal for controlling the swing mechanism unit, and a first hold position decision signal for deciding a hold position of the welding tool by the up/down motion drive mechanism section, and a second welding mode in which friction stir welding is performed on the basis of the welding condition signal, the swing control signal, and a second hold position decision signal which is obtained by correcting the first hold position decision signal so as to control a depth of a welded part constant in accordance with a state of the welded members, and includes the first welding mode and the second welding mode in one welding pass from insertion of the welding tool into between the welded members to draw-out thereof.

2. The friction stir welding apparatus according to claim 1, wherein the control device decides the welding condition of the welding tool, a swing control condition of the swing control unit, and the hold position of the welding tool by the up/down motion drive mechanism section in either the first welding mode or the second welding mode.

3. The friction stir welding apparatus according to claim 2, wherein
the control service starts friction stir welding of the welded members in the first welding mode and switches it to the second welding mode after elapse of a predetermined time.

4. The friction stir welding apparatus according to claim 1, wherein
the control device has a storage unit which stores the welding condition signal, the swing control signal, the first hold position decision signal, and the second hold position decision signal.

5. The friction stir welding apparatus according to claim 4, wherein
the control device makes the storage unit store in advance a hold position of the welding tool which is decided in accordance with an elapsed time after start of friction stir welding and decides the second hold position decision signal on the basis of the stored hold position.

6. The friction stir welding apparatus according to claim 5, wherein
the control device decides the second hold position decision signal from a plurality of hold position decision signals which are stored in advance in accordance with the elapsed time which is counted from the start of friction stir welding.

7. The friction stir welding apparatus according to claim 4, wherein
the control device makes the storage unit store in advance a hold position which is decided in accordance with a swing distance of the swing mechanism unit and decides the second hold position decision signal on the basis of the stored hold position.

8. The friction stir welding apparatus according to claim 7, wherein
the control device decides the second hold position decision signal from a plurality of hold position decision signals which are stored in advance in accordance with the swing distance of the swing mechanism unit which is measured from the start of friction stir welding.

9. The friction stir welding apparatus according to claim 4, wherein
the control device makes the storage unit store in advance a hold position which is decided in accordance with a swing angle of the swing mechanism unit and decides the second hold position decision signal on the basis of the stored hold position.

10. The friction stir welding apparatus according o claim 9, wherein
the control device decides the second hold position decision signal from a plurality of hold position decision signals which are stored in advance in accordance with the swing angle of the swing mechanism unit which is measured from start of friction stir welding.

11. A friction stir welding apparatus which welds together members by friction stir welding, comprising:
a control device which controls an operation of the friction stir welding apparatus;
a multiaxial robot arm which has a plurality of joints and is freely movable in a three-dimensional space;
a C-type frame which is connected to a leading end of the multiaxial robot arm;
a swing mechanism unit which is connected to one end of the C-type frame via an up/down motion drive mechanism section;
a holder unit which is connected to the swing mechanism unit via a revolving mechanism section;
a welding tool which is held to the holder unit; and
a pressing force receiving section which is connected to the other end of the C-type frame and receives pressing force from the welding tool, wherein
the control device has a first welding mode in which friction stir welding is performed on the basis of a welding condition signal for deciding a welding condition of the welding tool, a swing control signal for controlling the swing mechanism unit, and a first hold position decision signal for deciding a hold position of the welding tool by the up/down motion drive mechanism section, and
a second welding mode in which friction stir welding is performed on the basis of the welding condition signal, the swing control signal, and a second hold position decision signal which is obtained by correcting the first hold position decision signal so as to control a depth of a welded part constant in accordance with a state of the welded members, and
includes the first welding mode and the second welding mode in one welding pass from insertion of the welding tool into between the welded members to draw-out thereof.

12. The friction stir welding apparatus according to claim 11, wherein
the control device decides the welding condition of the welding tool, a swing control condition of the swing control unit, and the hold position of the welding tool by the up/down motion drive mechanism section in either the first welding mode or the second welding mode.

13. A friction stir welding method of welding together members by friction stir welding, comprising:
(a) the step of inserting a welding tool down to a predetermined position of a welded part between the welded members in accordance with instructions of a control unit;
(b) the step of subjecting the welded part to friction stir welding by swinging the welding tool along the welded part while controlling a height of the welding tool relative to the welded members so as to control a depth of the welded part constant in accordance with instructions of the control unit; and
(c) the step of drawing the welding tool out of the welded part at a time point that a swing amount of the welding tool reaches a predetermined position in accordance with instructions of the control unit.

14. The friction stir welding method according to claim 13, wherein
in the step (b), the height of the welding tool is controlled on the basis of a hold position of the welding tool which is decided in advance in accordance with any of an elapsed time, a swing distance of the welding tool and a swing angle of the welding tool which are measured from start of friction stir welding.

15. The friction stir welding method according to claim 13, wherein
it is spot welding that the step (a) to the step (c) are repetitively performed on the welded part between the welded members intermittently.

16. The friction stir welding method according to claim 14, wherein
it is spot welding that the step (a) to the step (c) are repetitively performed on the welded part between the welded members intermittently.

* * * * *